(12) United States Patent
Egawa et al.

(10) Patent No.: US 7,843,394 B2
(45) Date of Patent: Nov. 30, 2010

(54) RADIO ANTENNA UNIT AND MOBILE RADIO DEVICE EQUIPPED WITH THE SAME

(75) Inventors: Kiyoshi Egawa, Kanagawa (JP); Yoshio Koyanagi, Kanagawa (JP); Hiroshi Haruki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 455 days.

(21) Appl. No.: 11/721,065

(22) PCT Filed: Dec. 5, 2005

(86) PCT No.: PCT/JP2005/022295

§ 371 (c)(1),
(2), (4) Date: Jun. 7, 2007

(87) PCT Pub. No.: WO2006/062060

PCT Pub. Date: Jun. 15, 2006

(65) Prior Publication Data

US 2009/0231208 A1    Sep. 17, 2009

(30) Foreign Application Priority Data

Dec. 9, 2004    (JP) .............................. 2004-357328

(51) Int. Cl.
*H01Q 1/24*    (2006.01)

(52) U.S. Cl. ..................................... 343/702

(58) Field of Classification Search ................. 343/702, 343/730, 767, 770, 746, 853; 455/272, 277
See application file for complete search history.

(56) References Cited

U.S. PATENT DOCUMENTS

| | | | | |
|---|---|---|---|---|
| 3,996,592 | A | * 12/1976 | Kline et al. | .................. 343/817 |
| 4,631,546 | A | * 12/1986 | Dumas et al. | ............... 343/833 |
| 6,008,773 | A | 12/1999 | Matsuoka et al. | |
| 6,211,826 | B1 | 4/2001 | Aoki | |
| 6,216,017 | B1 * | 4/2001 | Lee et al. | ..................... 455/567 |

(Continued)

FOREIGN PATENT DOCUMENTS

JP    6-508019    9/1994

(Continued)

*Primary Examiner*—Huedung Mancuso
(74) *Attorney, Agent, or Firm*—Pearne & Gordon LLP

(57) ABSTRACT

A multi-band antenna can be realized by using a common antenna element with a simple configuration. A radio antenna unit includes a ground conductor plate 1 provided to a casing of a radio device and having a ground potential, a first radio circuit 2 handling a system in a first frequency band and a second radio circuit 3 handling a system in a second frequency band lower than the first frequency band, which are provided in the ground conductor plate 1, a first feeding line 4 connected to the first radio circuit 2 and being a coaxial transmission line having an outer conductor 5 that is arranged along the ground conductor plate 1, an antenna element 6 connected to the first feeding line 4 and the outer conductor 5 respectively, and arranged along the ground conductor plate 1, and a second feeding line 7 for connecting the second radio circuit 3 and the outer conductor 5, wherein the first feeding line 4 feeds a high frequency power input from the first radio circuit 2 and the second feeding line 7 feeds a high frequency power input from the second radio circuit 3.

12 Claims, 20 Drawing Sheets

U.S. PATENT DOCUMENTS

| | | | |
|---|---|---|---|
| 6,759,991 B2 * | 7/2004 | Boyle | 343/702 |
| 6,762,993 B1 * | 7/2004 | Kurosawa | 370/227 |
| 7,038,631 B2 * | 5/2006 | Jecko et al. | 343/767 |
| 7,443,344 B2 * | 10/2008 | Boyle | 343/700 MS |
| 2002/0019252 A1 | 2/2002 | Kuroda | |
| 2003/0050032 A1 | 3/2003 | Masaki | |

FOREIGN PATENT DOCUMENTS

| | | |
|---|---|---|
| JP | 05-350332 | 12/1994 |
| JP | 06-350322 | 12/1994 |
| JP | 08-097617 | 4/1996 |
| JP | 10-150319 | 6/1998 |
| JP | 11-136016 | 5/1999 |
| JP | 2000-341017 | 8/2000 |
| JP | 2001-345625 | 12/2001 |
| JP | 2002-51125 | 2/2002 |
| JP | 2003-87023 | 3/2003 |

* cited by examiner

RADIO ANTENNA UNIT AND MOBILE RADIO DEVICE EQUIPPED WITH THE SAME

TECHNICAL FIELD

The present invention relates to a radio antenna unit used in a mobile radio device and, more particularly, a multi-band radio antenna unit for transmitting/receiving a radio in a plurality of systems and a mobile radio device equipped with the same.

BACKGROUND ART

Out of the antenna units used in the radio capable of handling multiple bands in the prior art, there is the antenna unit that a feeding point is constructed in a mode of multiple coaxial lines and another coaxial line is connected to the outer conductor, and then the transmitter/receiver is connected to the transmitting/receiving antennas via each center conductor respectively (see Patent Literature 1, for example).

A configurative view of a multi-band antenna in the prior art is shown in FIG. 21. A reference numeral 1 is a ground conductor plate 1, 2 is a first radio circuit, 3 is a second radio circuit 3, 21 is an upper antenna element, 22 is a center conductor, 23 is a lower antenna element, 24, 25, 26 are outer conductors, and 27 is a center conductor of another coaxial line.

For example, a double coaxial line is provided to pass through the ground conductor plate 1 such as an outer wall surface of a high-speed moving body, or the like, and the upper antenna element 21 of the center conductor 22 in a plurality of transmitting/receiving antennas is connected to a center point of the antenna composed of a conductive circular plate, for example, and also the outer conductor 24 is connected coaxially to the lower antenna element 23, e.g., a center portion of the antenna also composed of the conductive circular plate. In such connecting state, the center conductor 22 is connected to the first radio circuit 2 and the center conductor 27 of another coaxial line connected to the outer conductor 24 is connected to the second radio circuit 3. Thus, the good antenna characteristic can be achieved at a plurality of frequencies.

Patent Literature 1: JP-A-6-350332

DISCLOSURE OF THE INVENTION

Problems that the Invention is to Solve

However, in the multi-band antenna of this type, plural antenna elements are needed. Also, not only the double coaxial line are employed but also the antenna configuration becomes very complicated. More specifically, the center conductor 27 of another coaxial line led from the side of the double coaxial line is connected to the outer conductor 24 of the double coaxial line via the ground conductor layer as the separating means for respective radio circuits, and the outer conductor 24 is short-circuited to the outer conductor 25 at a point that is away by a ¼ wave of the signal wave, which is received by the lower antenna element 23 via the outer conductor 24, in the opposite direction to the antenna over the double coaxial line from a connection point, and others. Thus, the multi-band antenna has a problem with size and configuration for use in the mobile radio device, or the like.

The present invention has been made in view of the above circumstances, and it is an object of the present invention to provide a radio antenna unit capable of realizing a multi-band antenna by using a common antenna element with a simple configuration and a mobile radio device equipped with the same.

Means for Solving the Problems

In order to achieve the above object, a radio antenna unit of the present invention includes a ground conductor plate provided to a casing of the radio device and having a ground potential; a first radio circuit handling a system in a first frequency band and a second radio circuit handling a system in a second frequency band lower than the first frequency band, which are provided in the ground conductor plate; a first feeding line connected to the first radio circuit, and the first feeding line serving as a coaxial transmission line having an outer conductor that is arranged in perpendicular to or in parallel with the ground conductor plate; an antenna element connected to the first feeding line and the outer conductor respectively, and arranged along the ground conductor plate; and a second feeding line for connecting the second radio circuit and the outer conductor.

According to this configuration, the high frequency power input from the first radio circuit is balanced-fed into the dipole antenna composed of the antenna element, and also the high frequency power input from the second radio circuit is input into the inverted F-type antenna composed of the coaxial transmission line and the antenna element connected to the outer conductor of the coaxial transmission line. Therefore, such an effect can be attained that the multi-band antenna can be constructed with a simple configuration.

Also, the radio antenna unit of the present invention further includes a switching deciding portion connected to the first radio circuit and the second radio circuit; and a switching element connected between the second feeding line and the second radio circuit, and controlled by the switching deciding portion.

According to this configuration, the dipole antenna that operates in the first frequency band can discount the influence of a leakage current of the inverted F-type antenna that operates in the second frequency band. As a result, such an effect can be attained that the good antenna characteristic can be obtained.

Also, the radio antenna unit of the present invention further includes a reactance element for a second frequency band provided between the second feeding line and the second radio circuit as a resonance circuit that becomes infinity in the first frequency band used in the first radio circuit and becomes short circuit in the second frequency band used in the second radio circuit.

According to this configuration, there is no need to switch the dipole antenna used in the first frequency band and the inverted F-type antenna used in the second frequency band by using the switching element, and also the dipole antenna that operates in the first frequency band can discount the influence of a leakage current of the inverted F-type antenna that operates in the second frequency band. As a result, such an effect can be attained that the good antenna characteristic can be obtained in both two frequency bands.

Also, the radio antenna unit of the present invention further includes an antenna element whose antenna element length is set to almost ½ wave in the second frequency band and is set to ½ wave or more in the first frequency band; a switching deciding portion connected to the first radio circuit and the second radio circuit; an antenna selecting switch connected to the first radio circuit and the second radio circuit and the first feeding line and the second feeding line; a matching circuit for the first frequency band and the second frequency band, provided between the first feeding line and the antenna selecting switch; a second feeding line for the second frequency band and a third feeding line for the first frequency band, for connecting the outer conductor of the coaxial transmission line; a feeding line switching switch connected to the second feeding line and the third feeding line and the antenna selecting switch; a reactance element for a second frequency band, provided between the second feeding line and the feeding line switching switch; and a reactance element for a first frequency band, provided between the third feeding line and the feeding line switching switch.

According to this configuration, either of the dipole antenna and the inverted F-type antenna can be selected in both the first frequency band and the second frequency band in response to a receiving level. Also, such an effect can be attained that the frequency band in which the inverted F-type antenna is selected can be operated as a diversity antenna that can be operated not to have the influence on the frequency band in which the dipole antenna is selected.

Also, the radio antenna unit of the present invention further includes a parasitic element arranged in parallel with and in vicinity of the antenna element.

According to this configuration, not only such an effect can be attained that the frequency band during the operation of the dipole antenna can be broadened by the parasitic element but also such an effect can be attained that the directivity can be varied in any direction by the arranging direction of the parasitic element because the parasitic element 20 acts as a director when such element is shorter than ½ wave and because the parasitic element acts as a reflector when such element is longer than ½ wave.

A mobile radio device of the present invention includes the radio antenna unit set forth in above.

According to this mobile radio device, the multi-band antenna consisting of the dipole antenna and the inverted F-type antenna can be provided with a simple configuration.

Also, preferably the radio antenna unit should be provided to a lower end portion of a radio case.

According to this configuration, the radio antenna unit is separated from the user's hand that holds of the case of the radio. Therefore, the radiation pattern in which deterioration of a vertical polarization component as an incoming polarization from the base station is small can be obtained.

Also, preferably the radio antenna unit should be provided to a flip that is joined to a lower end portion of a radio case to turn on an axial line extended in a width direction.

According to this configuration, the antenna unit can be positioned further away from the user's hand that is holding the case by turning the flip. Therefore, the good antenna characteristic can be obtained.

Also, preferably the radio antenna unit should be provided to an element to a lower end portion of a radio case to turn on an axial line extended in a thickness direction.

According to this configuration, the antenna unit can be positioned further away from the user's hand that is holding the case by turning the flip. Therefore, the good antenna characteristic can be obtained.

ADVANTAGES OF THE INVENTION

According to the radio antenna unit and the mobile radio device equipped with the same of the present invention, the high frequency power input from the first radio circuit is input into the dipole antenna composed of the antenna element, and also the high frequency power input from the second radio circuit is input into the inverted F-type antenna composed of the coaxial transmission line and the antenna element connected to the outer conductor of the coaxial transmission line. Therefore, the multi-band antenna can be constructed in any frequency band with a simple configuration.

Figure 1:
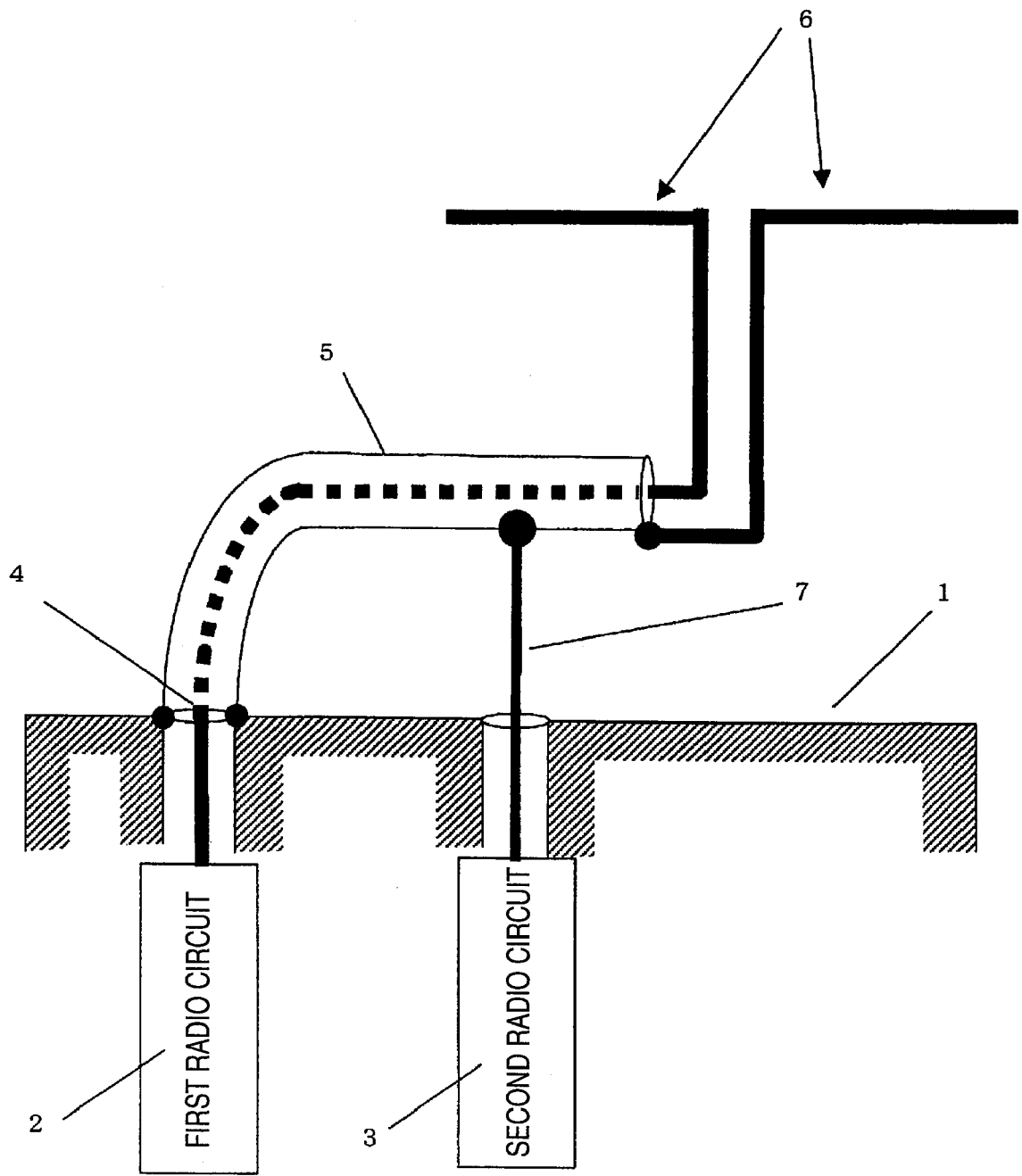
FIG. 1 A configurative view of a radio antenna unit according to a first embodiment of the present invention.

DESCRIPTION OF REFERENCE NUMERALS AND SIGNS 1 ground conductor plate
2 first radio circuit
3 second radio circuit
4 first feeding line
5 outer conductor
6 antenna element
7 second feeding line
8 upper case
9 lower case
10 flip
11 retractable element
12 switching element
13 switching deciding portion
14 reactance element for a second frequency band
15 antenna selecting switch
16 feeding line changing switch
17 reactance element for a first frequency band
18 third feeding line
19 matching circuit
20 parasitic element

BEST MODE FOR CARRYING OUT THE INVENTION

A radio antenna unit and a mobile radio device equipped with the same according to embodiments of the present invention will be explained hereinafter.

First Embodiment

A radio antenna unit according to a first embodiment of the present invention will be explained in detail with reference to the drawings hereunder.

A configurative view of a radio antenna unit of a first embodiment of the present invention is shown in FIG. 1. The radio antenna unit according to the first embodiment of the present invention includes the ground conductor plate 1 provided to a radio enclosure to have a ground potential, the first radio circuit 2 provided in the ground conductor plate 1 and corresponding to a system in a first frequency band and the second radio circuit 3 provided in the ground conductor plate 1 and corresponding to a system in a second frequency band lower than the first frequency band, a first feeding line 4 connected to the first radio circuit 2 and formed of an inner conductor of a coaxial transmission line with an outer conductor 5 that is arranged in perpendicular to or in parallel with the ground conductor plate 1, an antenna element 6 connected to the first feeding line 4 as the inner conductor of the coaxial transmission line and the outer conductor 5 of the coaxial transmission line respectively and arranged along the ground conductor plate 1, and a second feeding line 7 for connecting the second radio circuit 3 and the outer conductor 5. The first feeding line 4 feeds a high frequency power input from the first radio circuit 2, and the second feeding line 7 feeds a high frequency power input from the second radio circuit 3.

Figure 2:
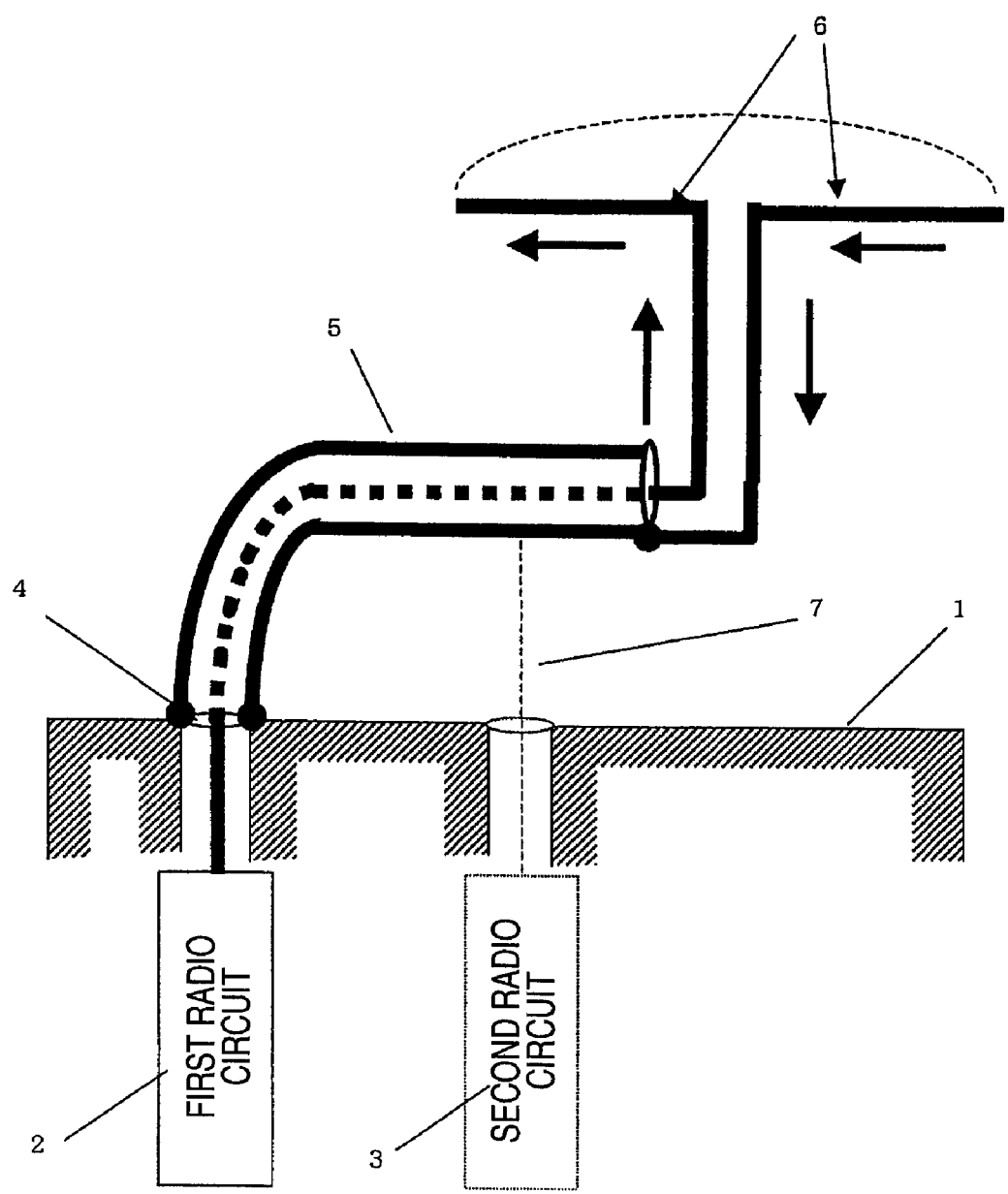
FIG. 2 A current distribution chart in a first frequency band according to the first embodiment of the present invention.
Figure 3:
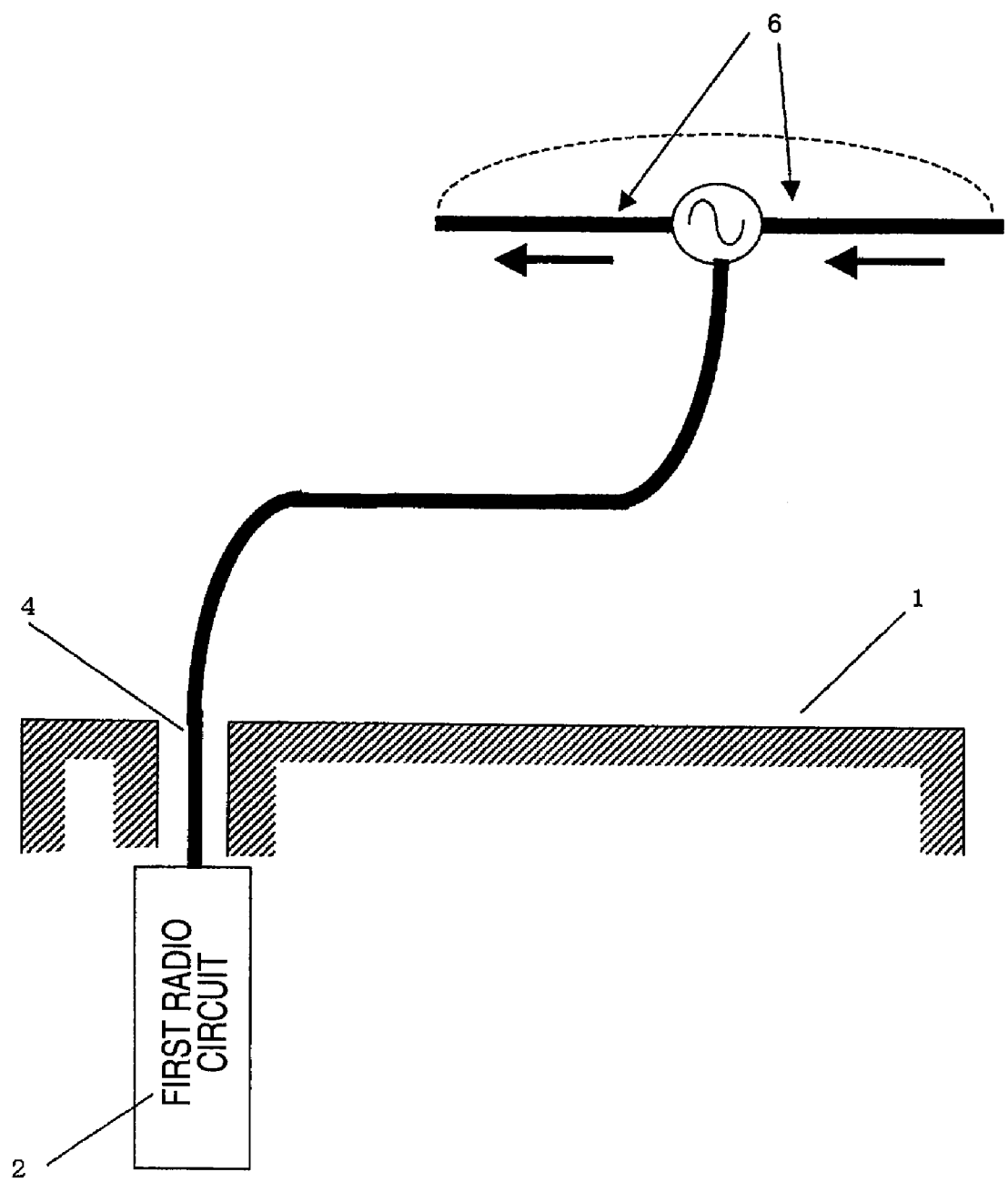
FIG. 3 An operating principle view in the first frequency band according to the first embodiment of the present invention.
Figure 4:
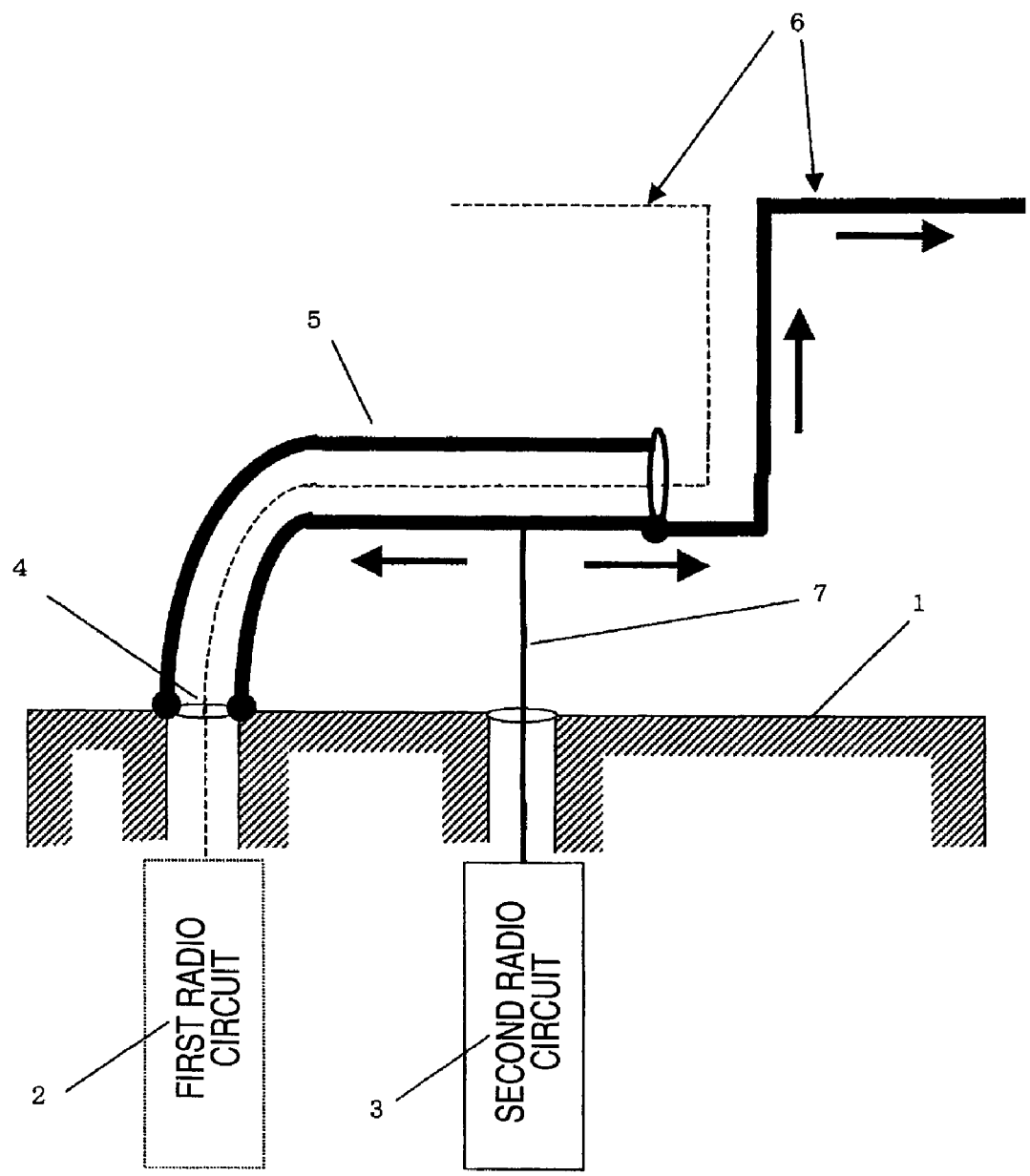
FIG. 4 A current distribution chart in a second frequency band according to the first embodiment of the present invention.
Figure 5:
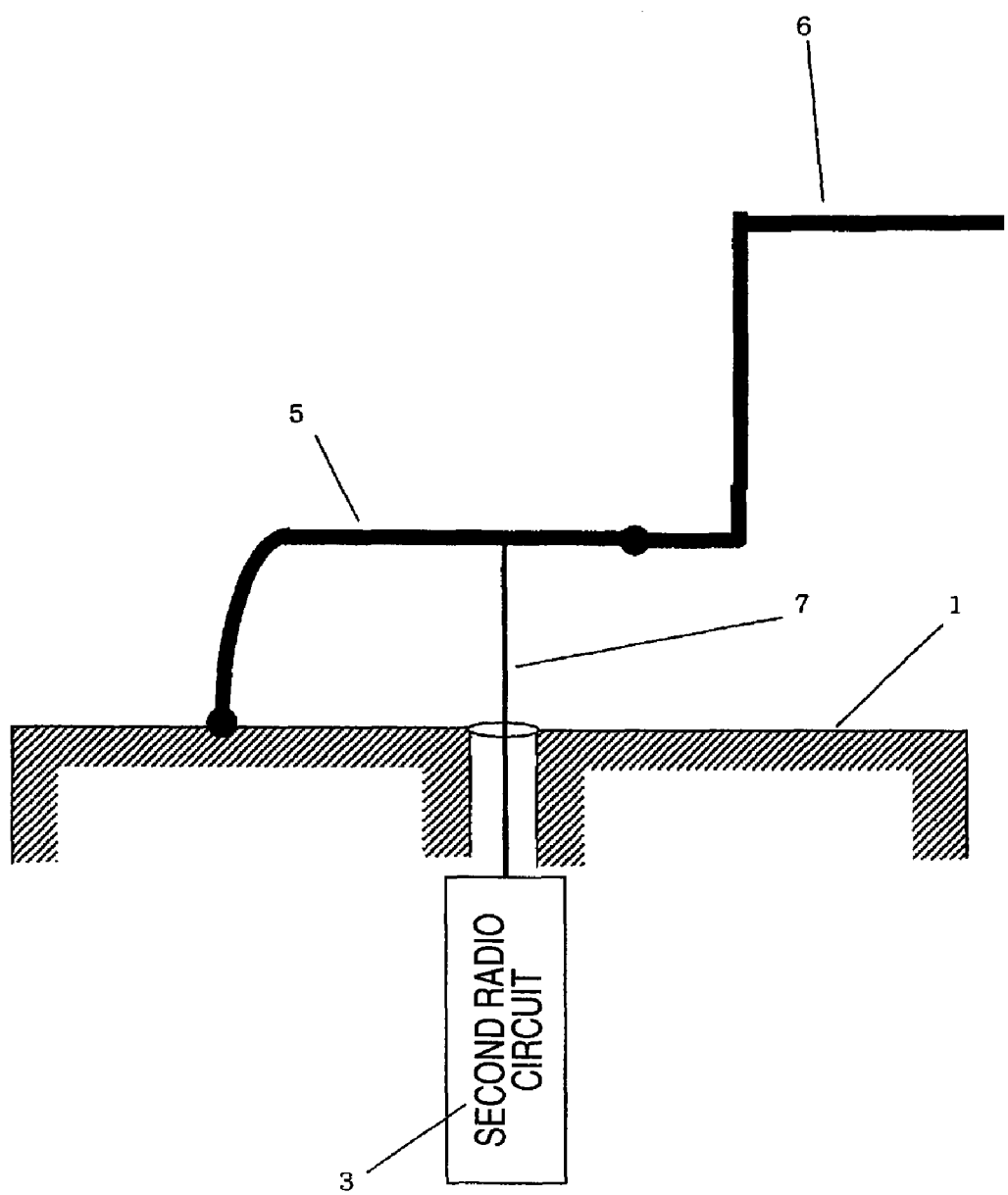
FIG. 5 An operating principle view in the second frequency band according to the first embodiment of the present invention.

According to this configuration, the high frequency power input from the first radio circuit 2 has a current distribution indicated with arrows and a broken line in FIG. 2. Therefore, a radio wave is radiated from a dipole antenna composed of the antenna element 6 shown in FIG. 3. In contrast, the high frequency power input from the second radio circuit 3 has current flows indicated with arrows in FIG. 4. Therefore, a radio wave is radiated from an inverted F-type antenna that is composed of the outer conductor 5 of the coaxial transmission line and the antenna element 6 connected to the outer conductor 5 of the coaxial transmission line shown in FIG. 5.

Here, the dipole antenna composed of the antenna element 6 is set to about a ½ wave with respect to a wavelength in the first frequency band as a using frequency band of the first radio circuit 2. Also, this dipole antenna acts as the inverted F-type antenna in the second frequency band as a using frequency band of the second radio circuit 3 because the second feeding line 7 is provided to a position in which a reactance obtained by an added length of the outer conductor 5 and the antenna element 6 connected to this outer conductor 5 can be corrected. As a result, such an effect can be attained that a dual-band antenna can be constructed with a simple configuration in any two-frequency bands.

Figure 6:
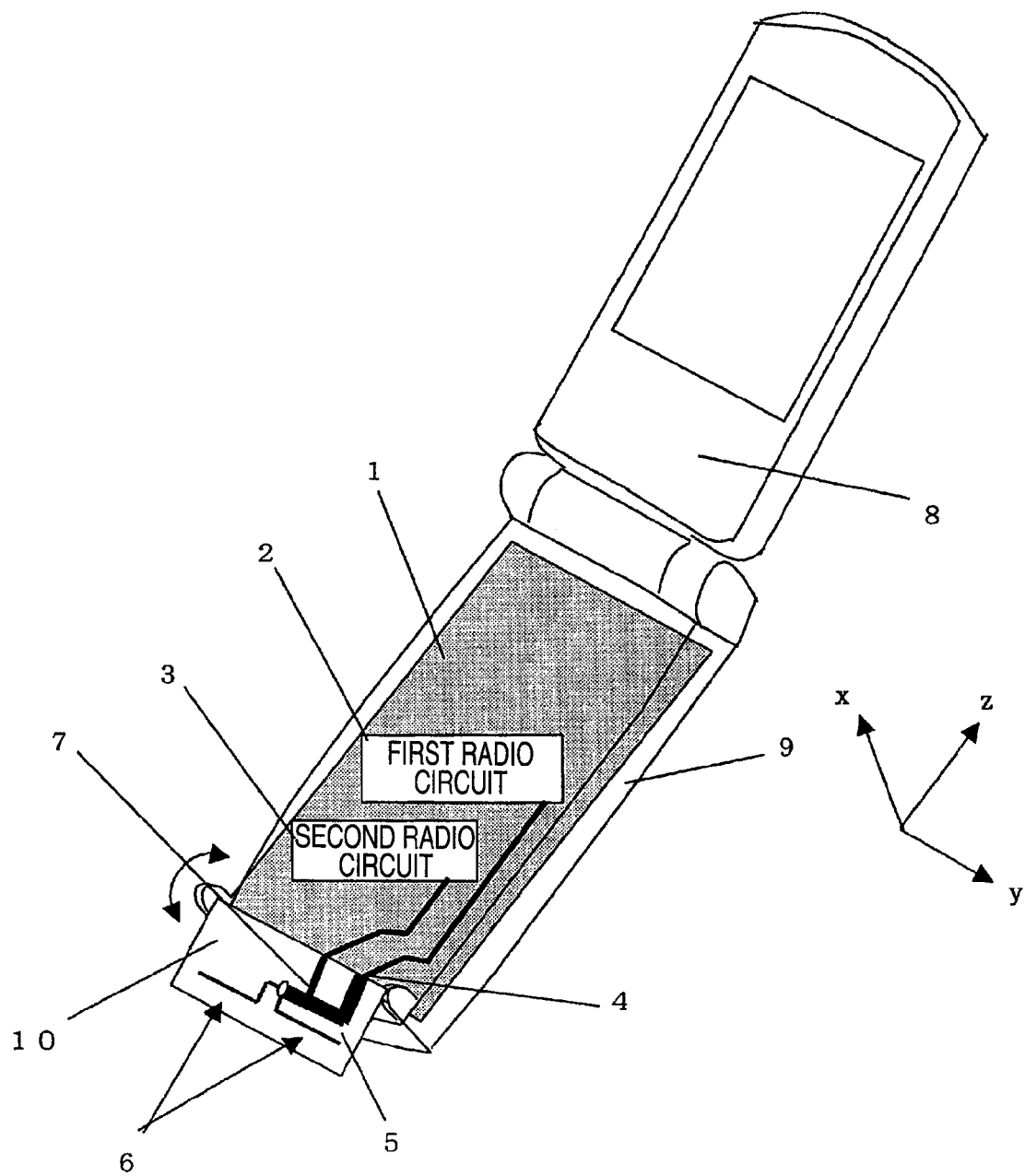
FIG. 6 A configurative view when the radio antenna unit according to the first embodiment of the present invention is applied to a mobile radio device.

An example of the case where the radio antenna unit of the first embodiment is applied to a mobile radio device using a folding case is shown in FIG. 6. The radio antenna unit of the present invention is constructed by providing a foldable flip 10 to a bottom portion of a lower case of the mobile radio device. Here, the flip 10 may be formed as either the folding type or the drawer type. As an example of the mobile radio device, a width is 40 mm, a length when the folding case is opened is 180 mm, and a length of the flip 10 is 15 mm. The first feeding line 4 extended from the first radio circuit 2 passes through the outer conductor 5 of the coaxial cable on the flip 10 and is connected to the antenna element 6, which acts as the dipole antenna. In contrast, the second feeding line 7 extended from the second radio circuit 3 is connected to the outer conductor 5 of the coaxial cable on the flip 10, which act as the inverted F-type antenna consisting of the outer conductor 5 and the antenna element 6.

Figure 7:
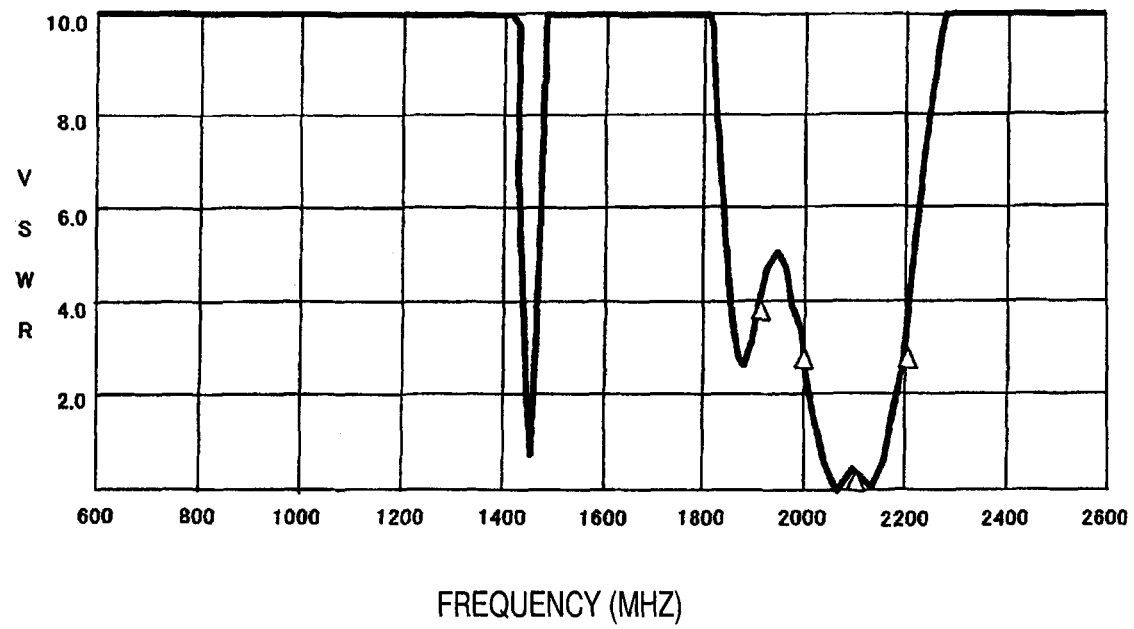
FIG. 7 A VSWR characteristic diagram when the radio antenna unit according to the first embodiment of the present invention is applied to the mobile radio device to operate as a dipole antenna.
Figure 8:
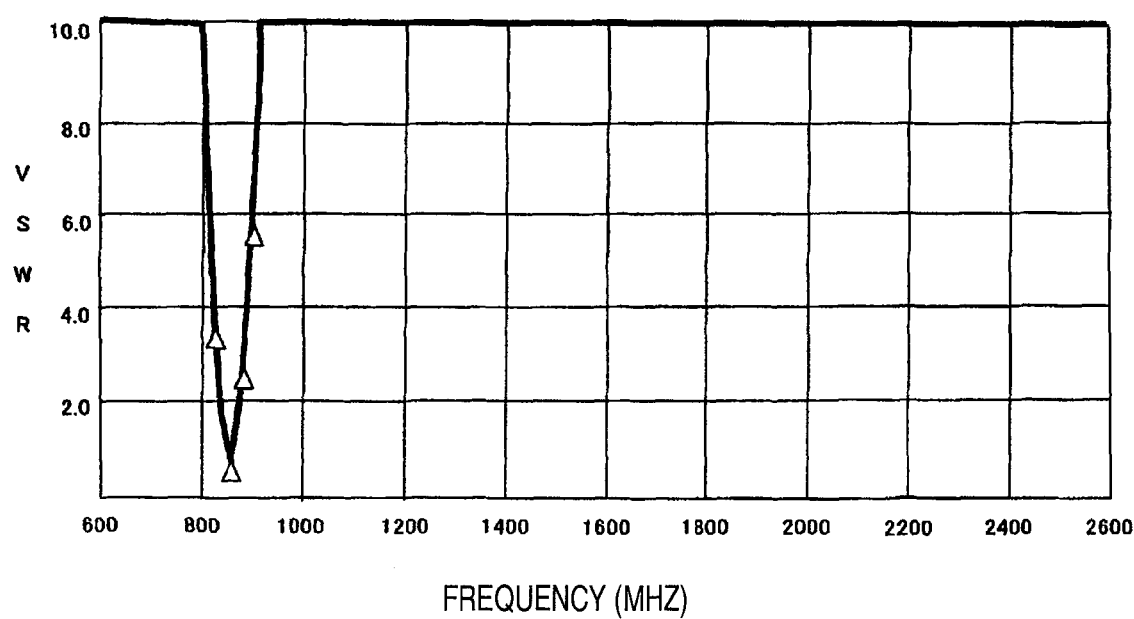
FIG. 8 A VSWR characteristic diagram when the radio antenna unit according to the first embodiment of the present invention is applied to the mobile radio device to operate as an inverted F-type antenna.

A voltage standing wave ratio (abbreviated as "VSWR" hereinafter) characteristic when a using frequency band of the first radio circuit 2 is set to a 1900 MHz band and the antenna element 6 is activated as the dipole antenna is shown in FIG. 7. A VSWR characteristic when a using frequency band of the second radio circuit 3 is set to an 800 MHz band and the outer conductor 5 and the antenna element 6 are activated as the inverted F-type antenna is shown in FIG. 8. As can be seen from these Figures, both antennas operate as the independent antenna in the 1900 MHz band and the 800 MHz band, and have a desired characteristic respectively.

Figure 9:
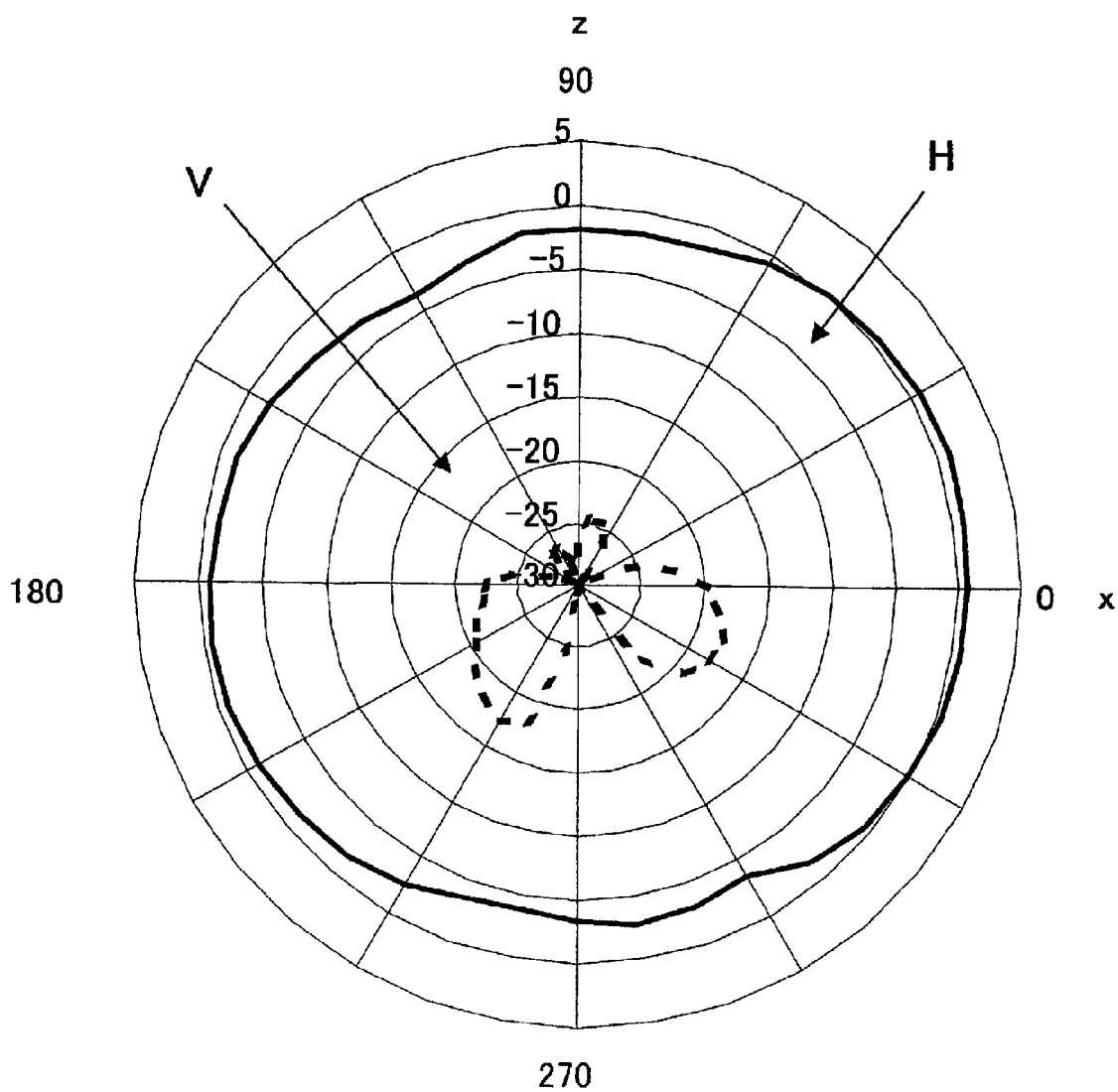
FIG. 9 A radiation characteristic chart in free space when the radio antenna unit according to the first embodiment of the present invention is applied to the mobile radio device to operate as the dipole antenna.
Figure 10:
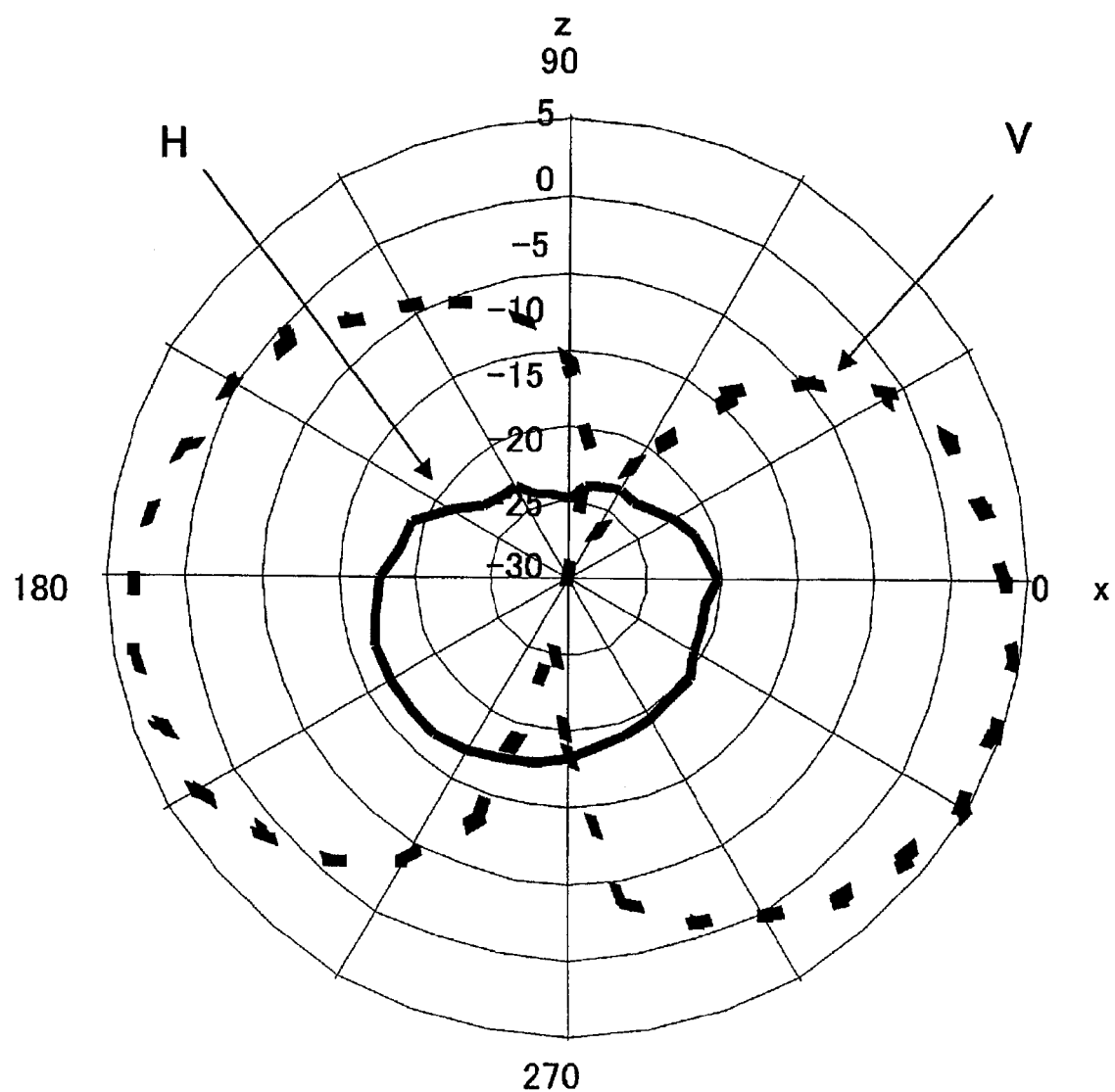
FIG. 10 A radiation characteristic chart in free space when the radio antenna unit according to the first embodiment of the present invention is applied to the mobile radio device to operate as the inverted F-type antenna.

A radiation pattern in free space when the radio antenna unit of the first embodiment operates as the dipole antenna is shown in FIG. 9. Here, a measuring frequency is 1950 MHz, and H indicated by a solid line is a horizontally polarized wave and V indicated by a broken line is a vertically polarized wave. Because the dipole antenna is arranged in the width direction of the flip 10 shown in FIG. 6, the horizontal polarization is a main polarization. In contrast, a radiation pattern in free space when the radio antenna unit of the first embodiment operates as the inverted F-type antenna is shown in FIG. 10. Here, a measuring frequency is 800 MHz and, as in FIG. 9, H indicated by a solid line is a horizontally polarized wave and V indicated by a broken line is a vertically polarized wave. Although the inverted F-type antenna is arranged in the width direction of the flip 10 shown in FIG. 6, a main polarization is the vertical polarization because the radiation from the ground conductor plate 1 is strong.

Figure 11:
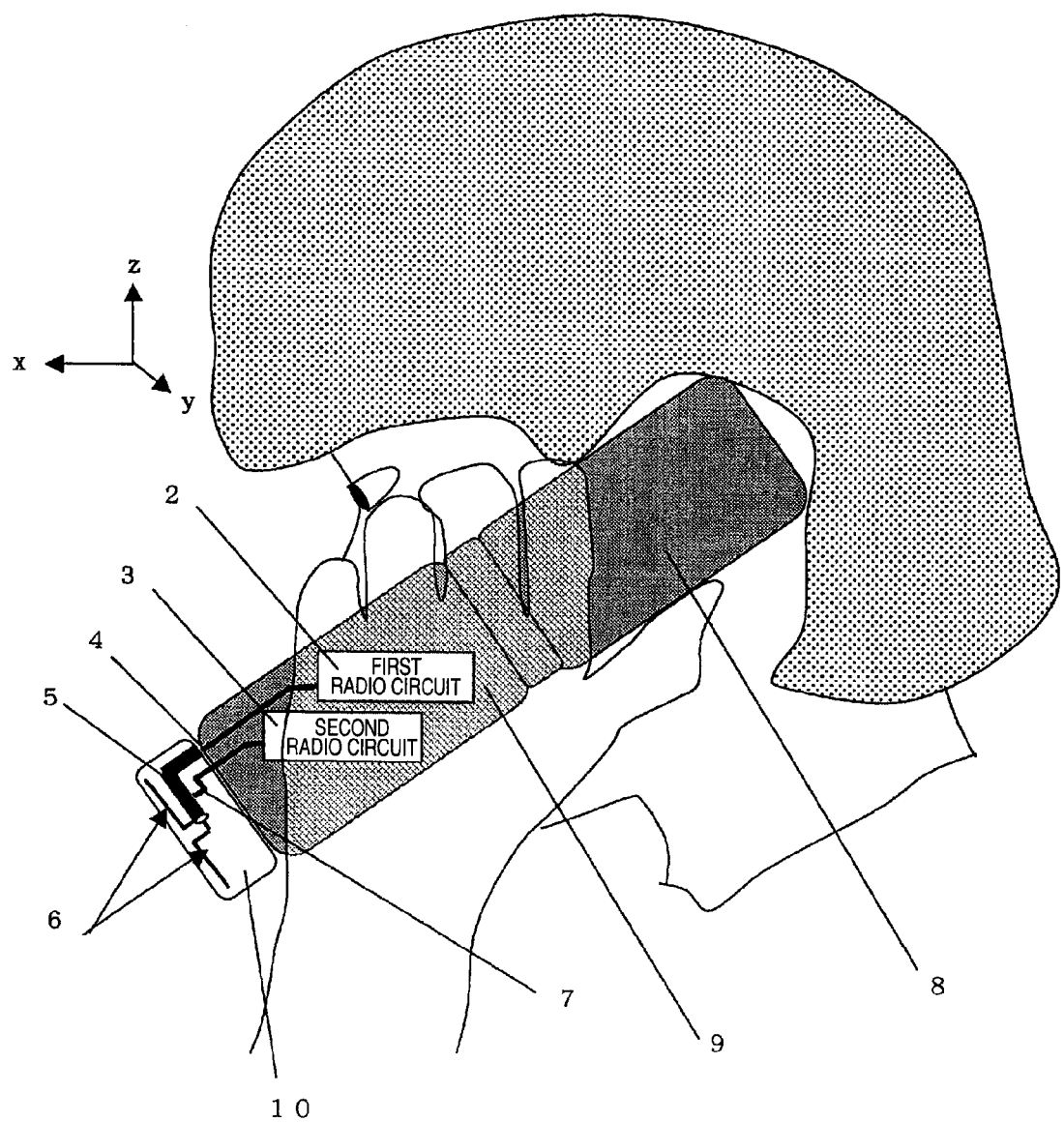
FIG. 11 A view showing a using mode when the radio antenna unit according to the first embodiment of the present invention is applied to the mobile radio device.
Figure 12:
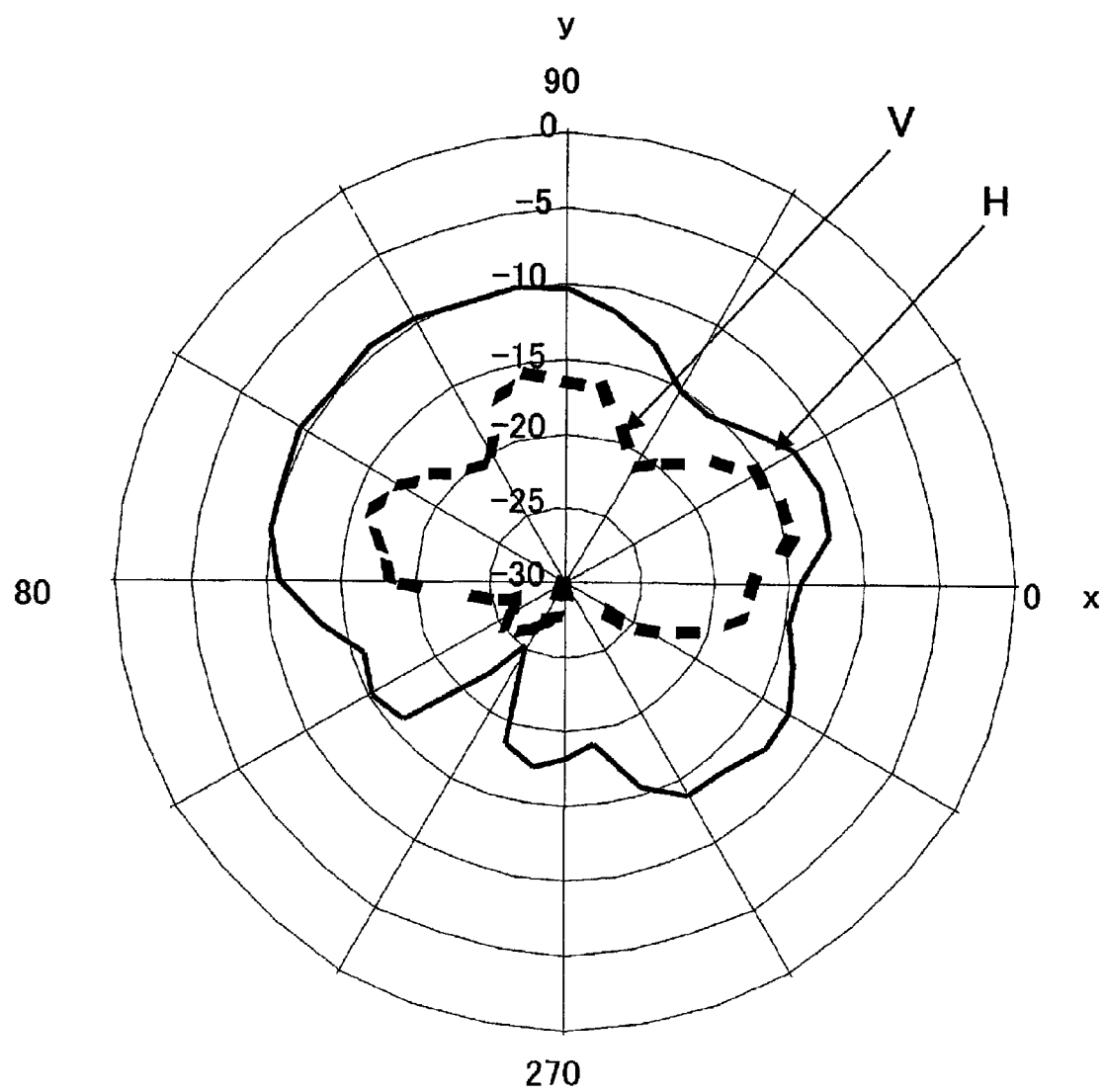
FIG. 12 A radiation characteristic chart during a talking when the radio antenna unit according to the first embodiment of the present invention is applied to the mobile radio device to operate as the dipole antenna.

In the antenna in JP-A-2004-208219 cited as representative, or the like, which has a feeding point near the hinge and whose entire case is constructed as the dipole antenna, the feeding point is covered with the user's hand in such a using mode that the user's hand holds around the center of the case, as shown in FIG. 11. As a consequence, the radiation pattern during a talking state is conspicuously deteriorated, as shown in FIG. 12.

Figure 13:
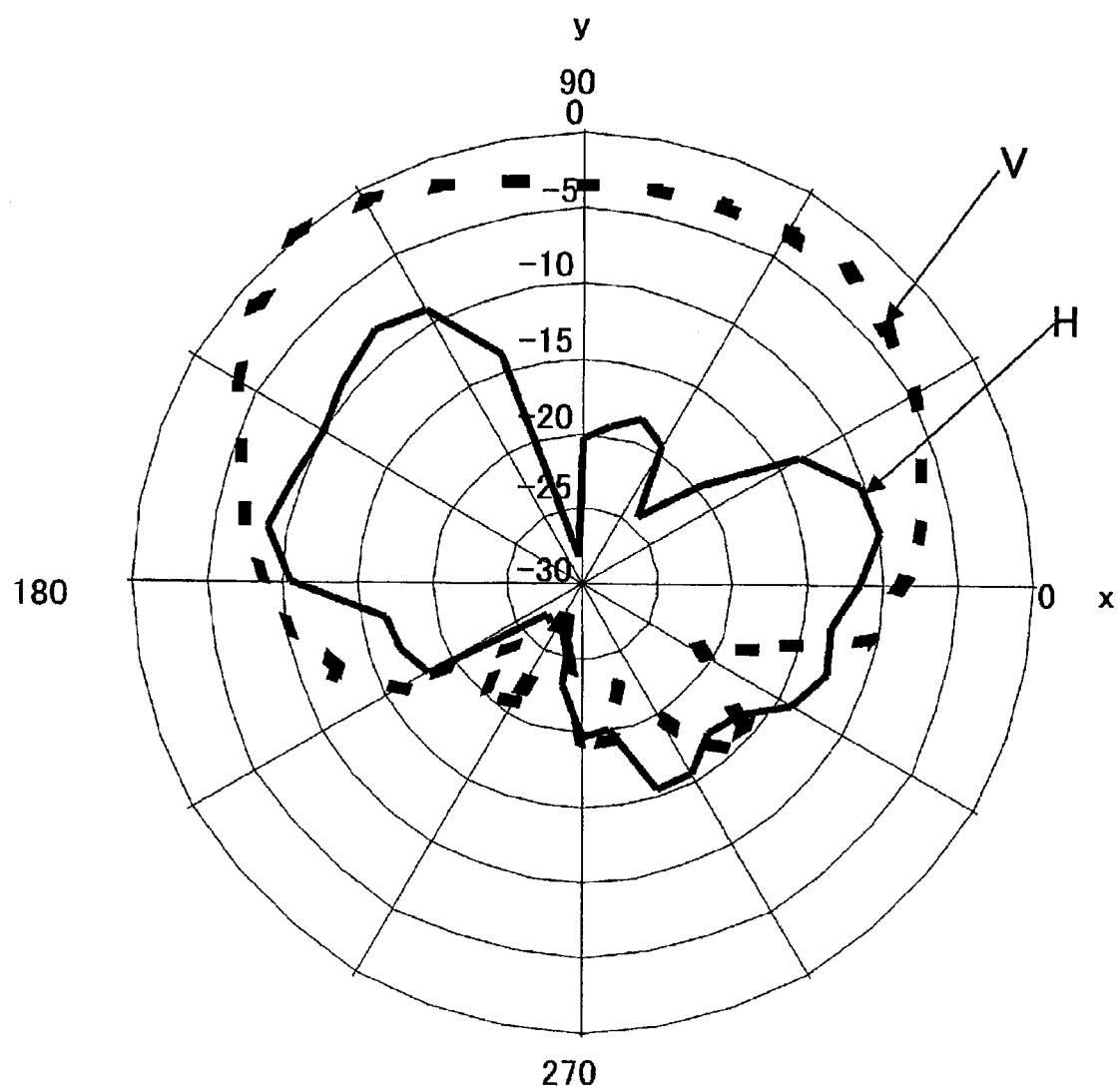
FIG. 13 A radiation characteristic chart of an ordinary enclosure-type dipole antenna during a talking.

However, in such enclosure-type dipole antenna, when the radio antenna unit of the present invention is applied to the bottom end of the case, the radio antenna unit of the present invention is separated from the user's hand in such a using mode that the user's hand holds around the center of the case, as shown in FIG. 11. As a result, a radiation pattern in which deterioration of a vertical polarization component as an incoming polarization from the base station is small can be obtained, as shown in FIG. 13, and also a diversity antenna can be constructed.

Figure 14:
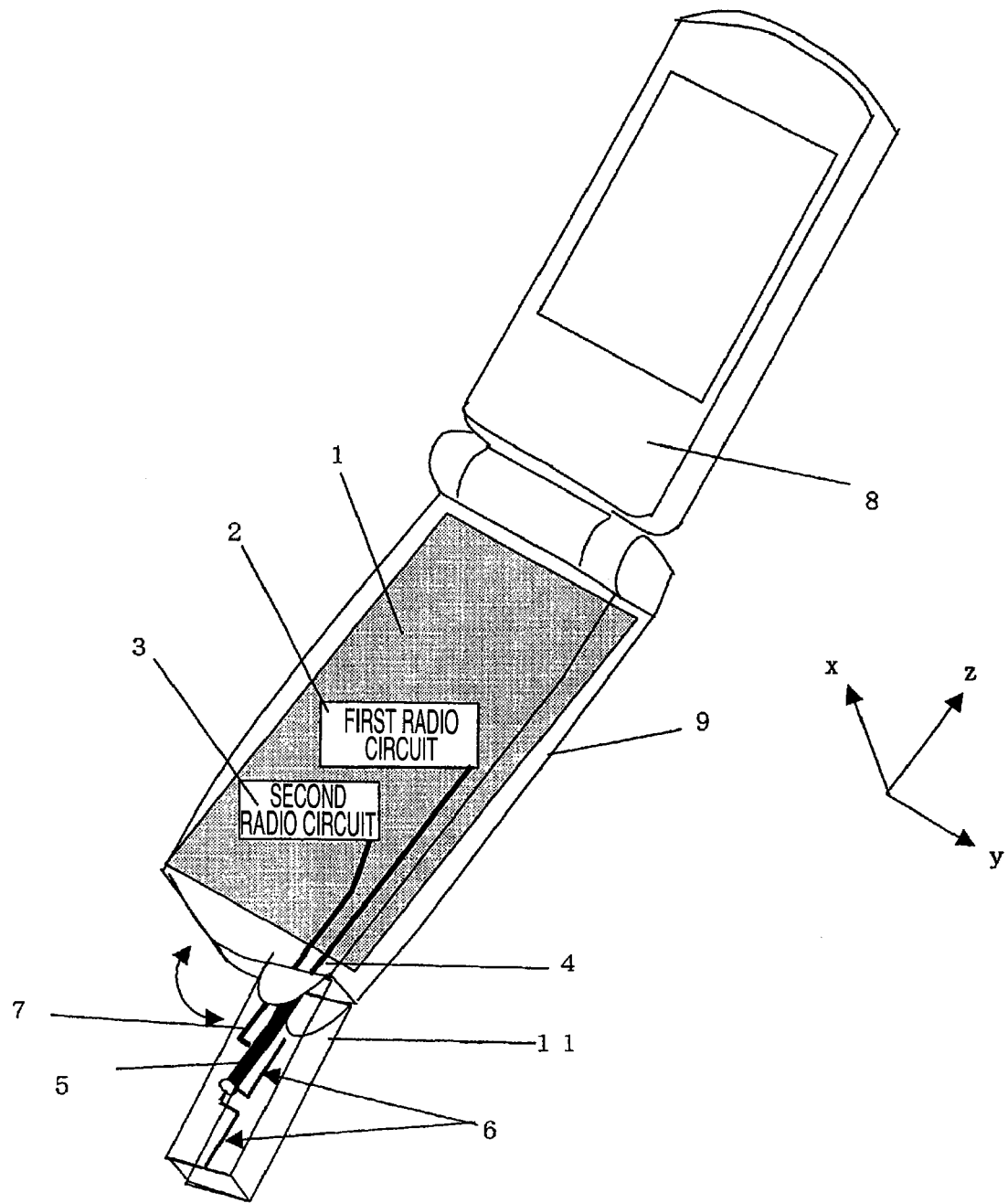
FIG. 14 A configurative view when the radio antenna unit according to the first embodiment of the present invention is constructed as another retractable element and is applied to the mobile radio device.
Figure 15:
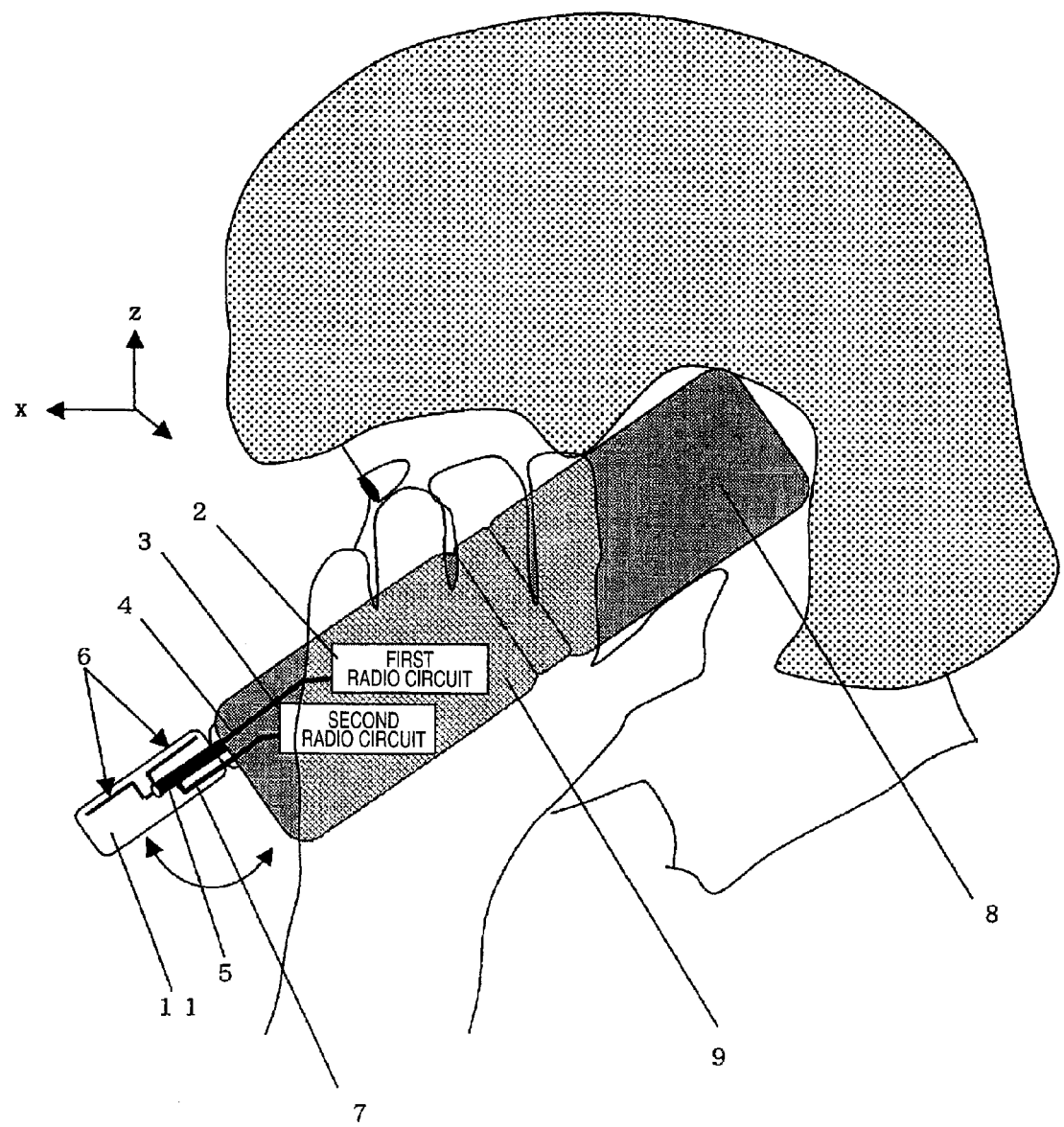
FIG. 15 A view showing a using mode when the radio antenna unit according to the first embodiment of the present invention is constructed as another retractable element and is applied to the mobile radio device.

Here, as another example of the case where the radio antenna unit is applied to the mobile radio device, a retractable element 11 may be provided to a bottom portion of a lower case 9 of the mobile radio device, as shown in FIG. 14, instead of the folding flip 10. When the radio antenna unit of the present invention is applied to such retractable element 11, the radio antenna unit of the present invention is positioned away from the user's hand in a talking state, as shown in FIG. 15. As a result, the good antenna characteristic can be attained.

Also, a feeding line formed of a strip line may be used as the coaxial cable arranged in the flip 10 or the retractable element 11.

Second Embodiment

A radio antenna unit according to a second embodiment of the present invention will be explained with reference to the drawings hereunder.

Figure 16:
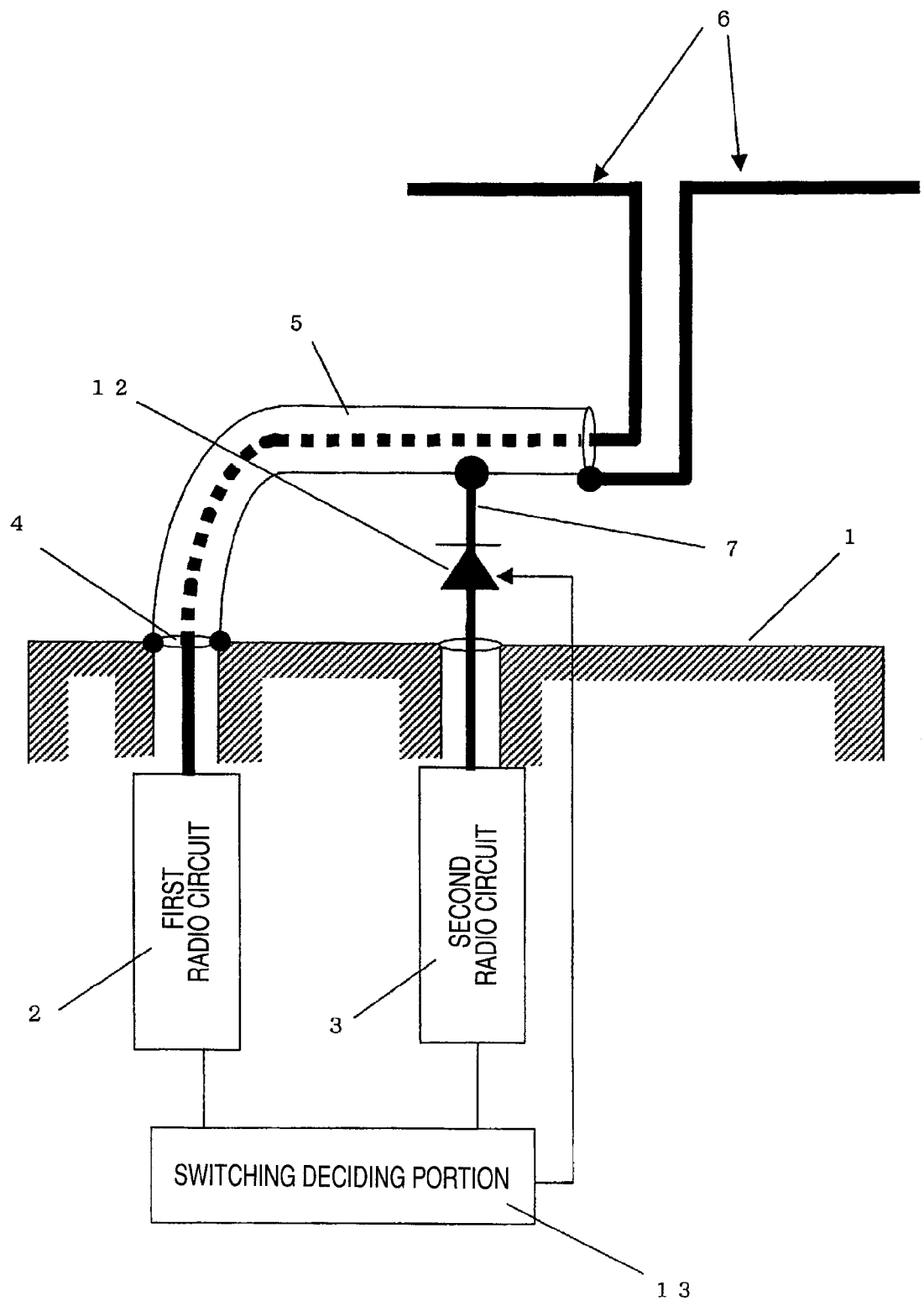
FIG. 16 A configurative view of a radio antenna unit according to a second embodiment of the present invention.

A configurative view of a radio antenna unit of a second embodiment of the present invention is shown in FIG. 16. Here, the same reference symbols are affixed to the portions having the same configurations as those of the radio antenna unit of the first embodiment, and their explanation will be omitted herein.

In the radio antenna unit of a second embodiment of the present invention, a switching deciding portion 13 is connected to the first radio circuit 2 and the second radio circuit 3. Also, a switching element 12 controlled by the switching deciding portion 13 is provided between the second feeding line 7 and the second radio circuit 3.

Then, in this radio antenna unit, the switching deciding portion 13 decides which one of the first radio circuit 2 and the second radio circuit 3 is being used. When the first radio circuit 2 is being used, the switching element 12 is turned OFF by the switching deciding portion 13 and thus the second feeding line 7 can be disconnected from the outer conductor 5. Therefore, the dipole antenna composed of the antenna element 6 that operates in the first frequency band can discount the influence of a leakage current flowing through the outer conductor 5 from the second radio circuit 3 in the second frequency band. As a result, such an effect can be attained that the good antenna characteristic can be obtained.

Third Embodiment

A radio antenna unit according to a third embodiment of the present invention will be explained with reference to the drawings hereunder.

Figure 17:
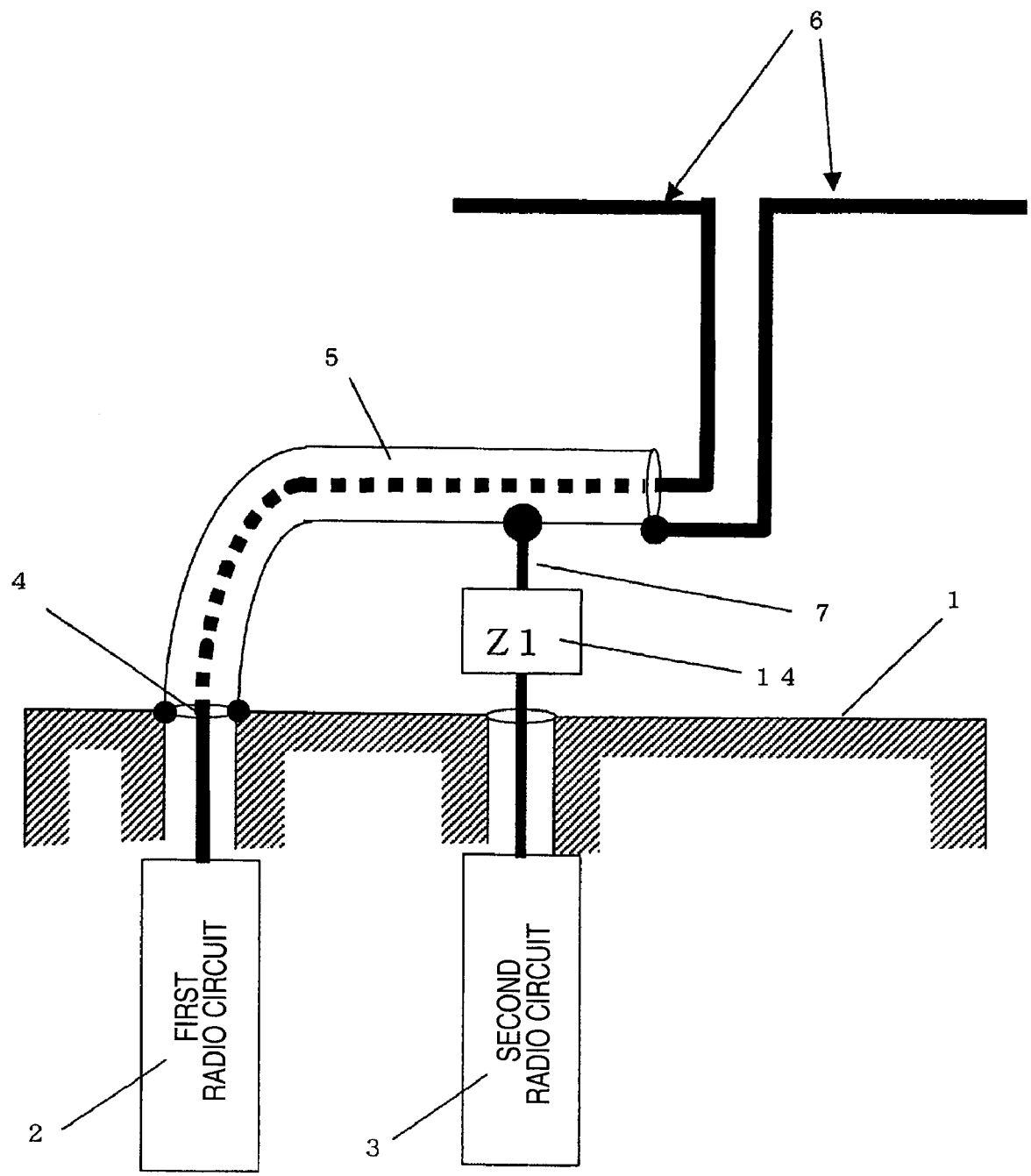
FIG. 17 A configurative view of a radio antenna unit according to a third embodiment of the present invention.

A configurative view of a radio antenna unit of a third embodiment of the present invention is shown in FIG. 17. Here, the same reference symbols are affixed to the portions having the same configurations as those of the radio antenna unit of the first embodiment, and their explanation will be omitted herein.

In the radio antenna unit of the second embodiment, the case where the switching element 12 is connected between the second radio circuit 3 and the second feeding line 7 is explained. In the third embodiment, as shown in FIG. 17, a reactance element 14 for a second frequency band is connected between the second radio circuit 3 and the second feeding line 7 in place of the switching element 12. In this case, the reactance element 14 for the second frequency band has an impedance characteristic that becomes infinity in the first frequency band used by the first radio circuit 2 and becomes short circuit in the second frequency band used by the second radio circuit 3.

With such arrangement, there is no need to decide a using situation of the first radio circuit 2 and the second radio circuit 3 by the switching deciding portion 13 used in the second embodiment, and the dipole antenna composed of the antenna element 6 that operates in the first frequency band can discount the influence of the inverted F-type antenna that is composed of the antenna element 6 and the outer conductor 5 and operates in the second frequency band. As a result, such an effect can be attained that the good antenna characteristic can be obtained.

Fourth Embodiment

A radio antenna unit according to a fourth embodiment of the present invention will be explained with reference to the drawings hereunder.

Figure 18:
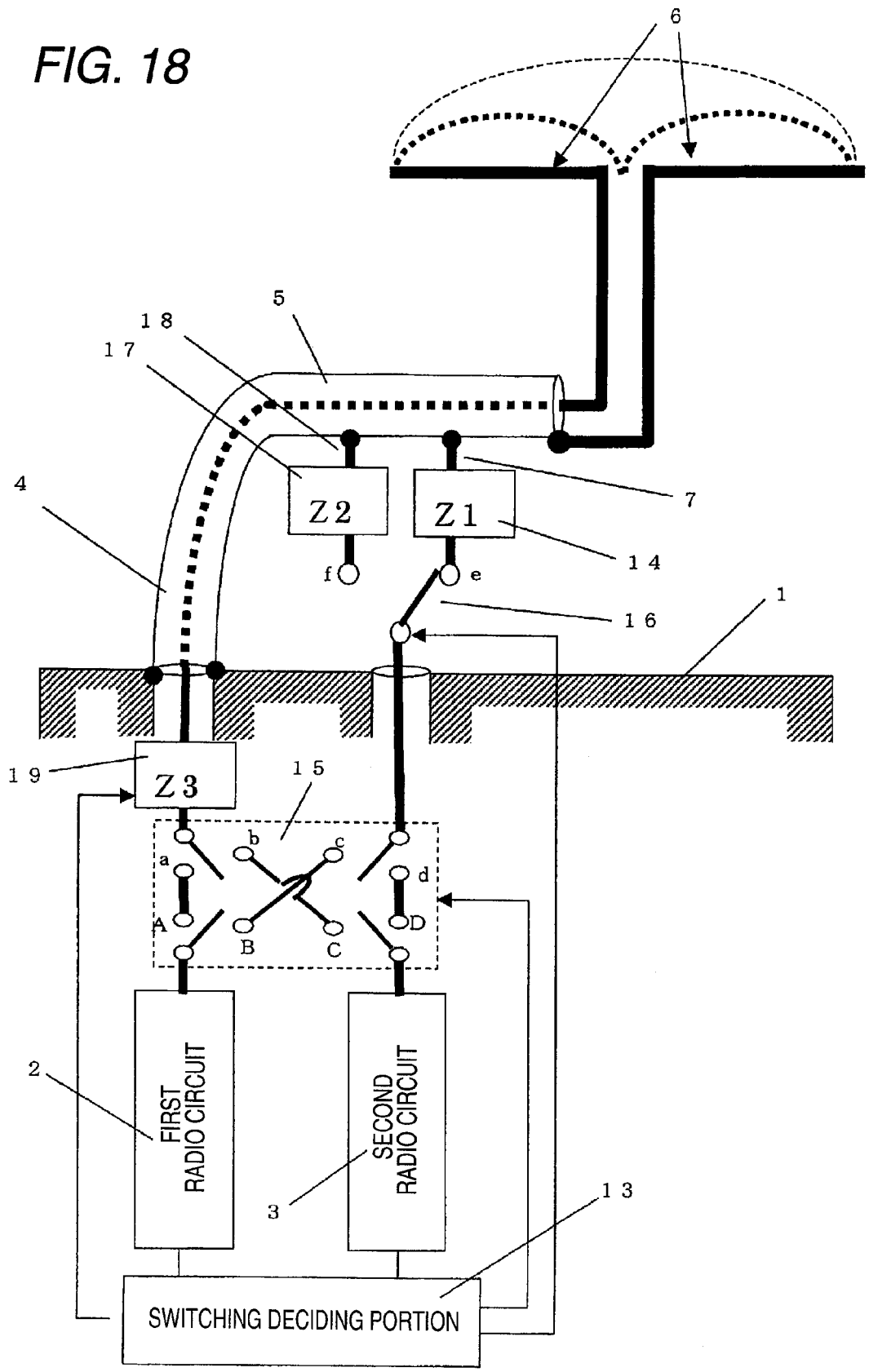
FIG. 18 A configurative view of a radio antenna unit according to a fourth embodiment of the present invention.

A configurative view of a radio antenna unit of a fourth embodiment of the present invention is shown in FIG. 18. Here, the same reference symbols are affixed to the portions having the same configurations as those of the radio antenna unit of the first embodiment, and their explanation will be omitted herein.

In the radio antenna unit of the fourth embodiment of the present invention, the switching deciding portion 13 decides which one of the case where the radio wave is received by the dipole antenna composed of the antenna element 6 and the case where the radio is received by the inverted F-type antenna composed of the antenna element 6 and the outer conductor 5 can give higher reception conditions of the first radio circuit 2 and the second radio circuit 3. Then, an antenna selecting switch 15 and a feeding line changing switch 16 are switched respectively based on the decision result.

Also, a matching circuit 19 for the first frequency band and the second frequency band is provided between the first feeding line 4 and the antenna selecting switch 15.

In addition, the reactance element 14 for the second frequency band, whose reactance becomes infinity in the first frequency band and becomes short-circuit in the second frequency band, is connected between the second feeding line 7 and the feeding line changing switch 16. Also, a reactance element 17 for the first frequency band, whose reactance becomes infinity in the second frequency band and has some value in the first frequency band, is connected between a third feeding line 18 and the feeding line changing switch 16.

Then, in this radio antenna unit, based on the decision result of the switching deciding portion 13, the antenna selecting switch 15 and the feeding line changing switch 16 switched respectively as follows.

|  | antenna selecting switch | feeding line changing switch |
| --- | --- | --- |
| First radio circuit | Dipole antenna A-a | |
| Second radio circuit | Inverted F-type D-d | e |
| First radio circuit | Inverted F-type B-c | f |
| Second radio circuit | Dipole antenna C-b | |

With such configuration, both the first radio circuit 2 and the second radio circuit 3 can select any one of two antennas of the dipole antenna composed of the antenna element 6 and the inverted F-type antenna composed of the antenna element 6 and the outer conductor 5.

Also, as described above, the reactance element 14 for the second frequency band, whose reactance becomes infinity in the first frequency band and becomes short-circuit in the second frequency band, is connected between the second feeding line 7 and the feeding line changing switch 16. Also, the reactance element 17 for the first frequency band, whose reactance becomes infinity in the second frequency band and has some value in the first frequency band, is connected between a third feeding line 18 and the feeding line changing switch 16. Therefore, the dipole antenna can ignore the influence of the inverted F-type antenna composed of the antenna element 6 and the outer conductor 5 even when such dipole antenna operates in either of two frequency bands. As a result, such an effect can be attained that the good antenna characteristic can be obtained.

Fifth Embodiment

A radio antenna unit according to a fifth embodiment of the present invention will be explained with reference to the drawings hereunder.

Figure 19:
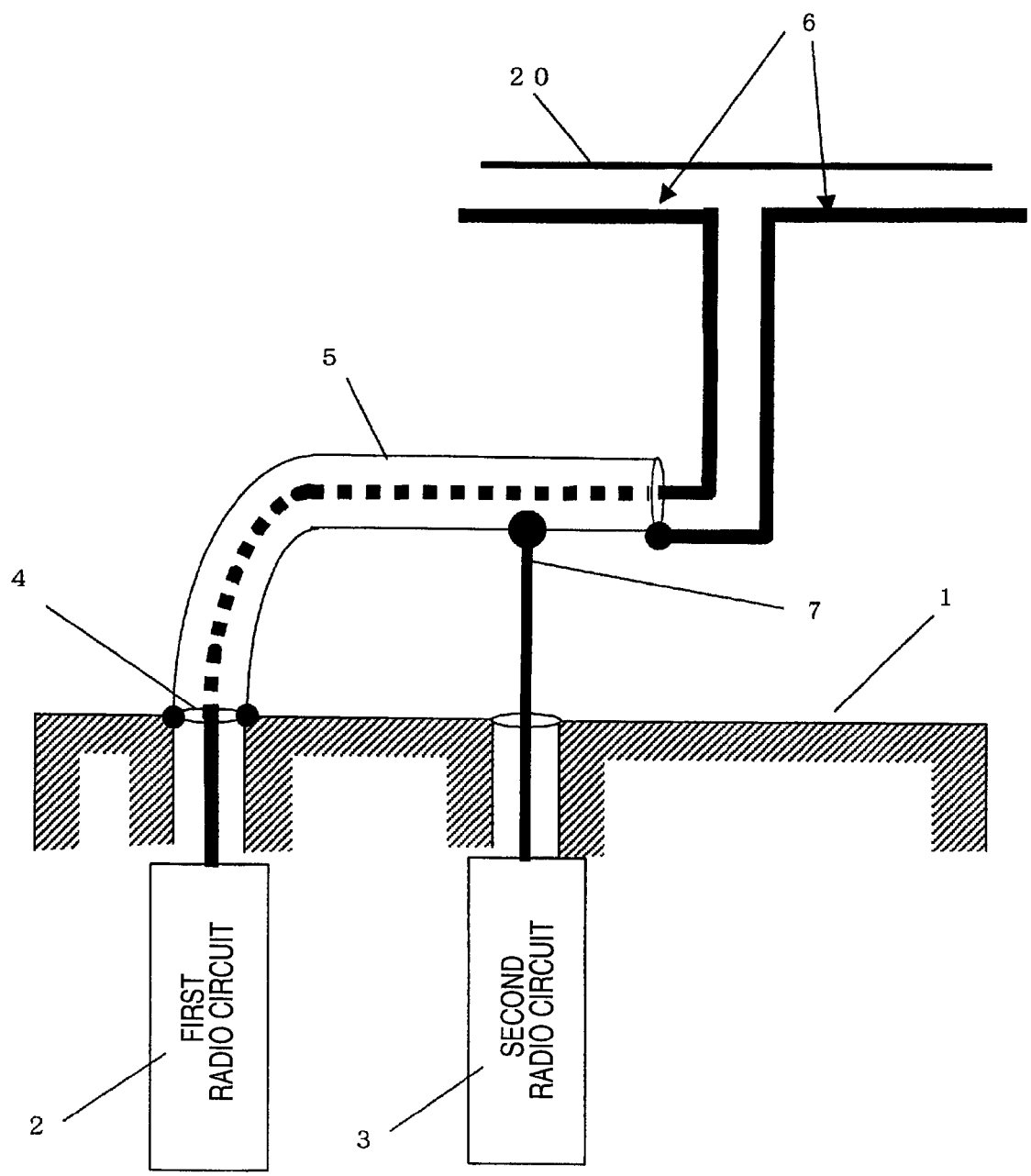
FIG. 19 A configurative view of a radio antenna unit according to a fifth embodiment of the present invention.

A configurative view of a radio antenna unit of a fifth embodiment of the present invention is shown in FIG. 19. Here, the same reference symbols are affixed to the portions having the same configurations as those of the radio antenna unit of the first embodiment, and their explanation will be omitted herein.

In the radio antenna unit of the fifth embodiment of the present invention, a parasitic element 20 of almost ½ wave is arranged in vicinity of, preferable in close vicinity of the dipole antenna composed of the antenna element 6.

With such arrangement, when the dipole antenna operated in the first frequency band is activated, its directivity can be directed in a desired direction because the parasitic element 20 acts as a reflector if such element is longer than ½ wave and because the parasitic element 20 acts as a director if such element is shorter than ½ wave. Also, the inverted F-type antenna that is composed of the antenna element 6 and the outer conductor 5 and operates in the second frequency band can disregard the influence of the parasitic element 20. As a result, such an effect can be attained that the good antenna characteristic can be obtained.

Figure 20:
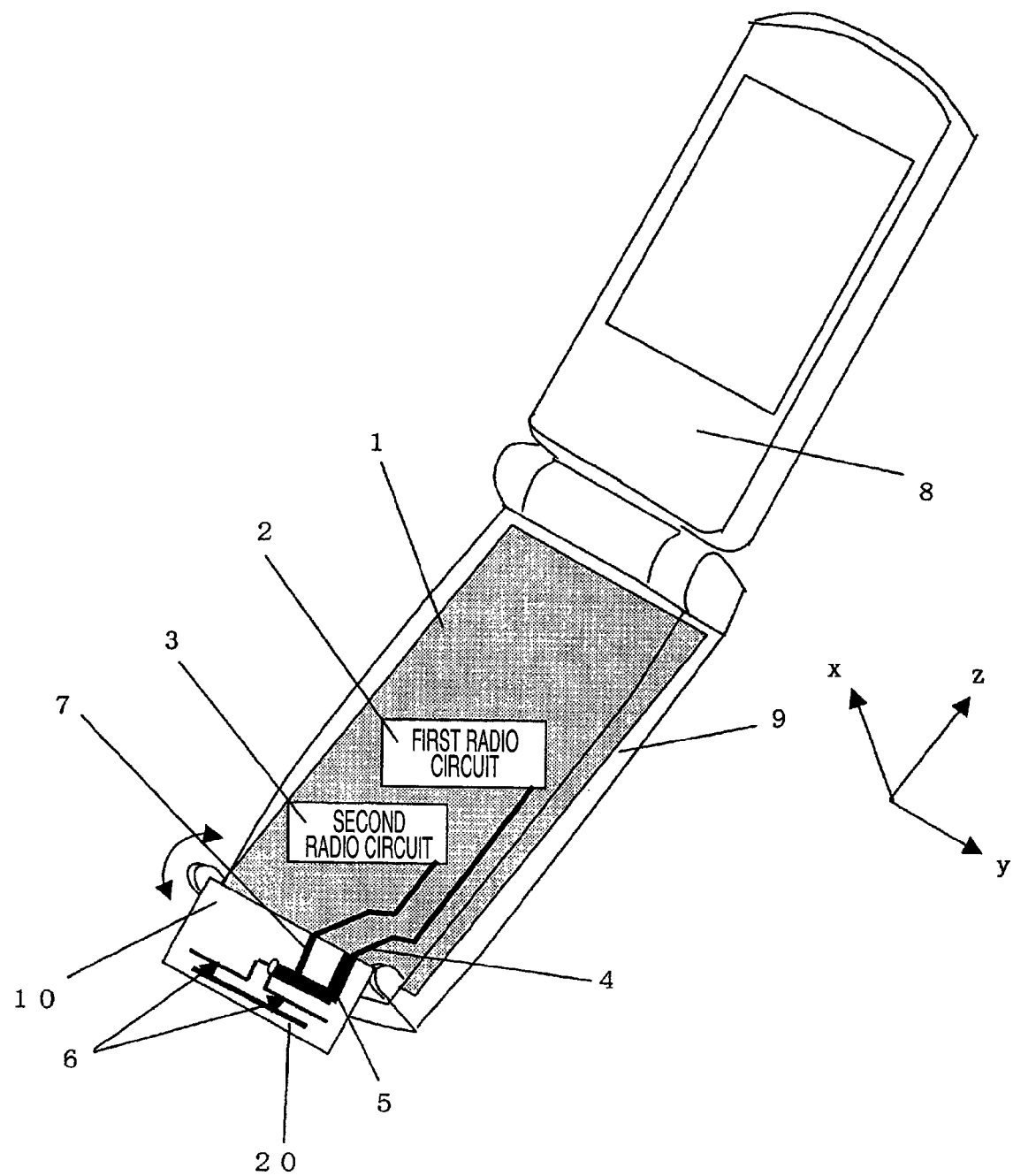
FIG. 20 A configurative view when the radio antenna unit according to the fifth embodiment of the present invention is applied to the mobile radio device.
Figure 21:
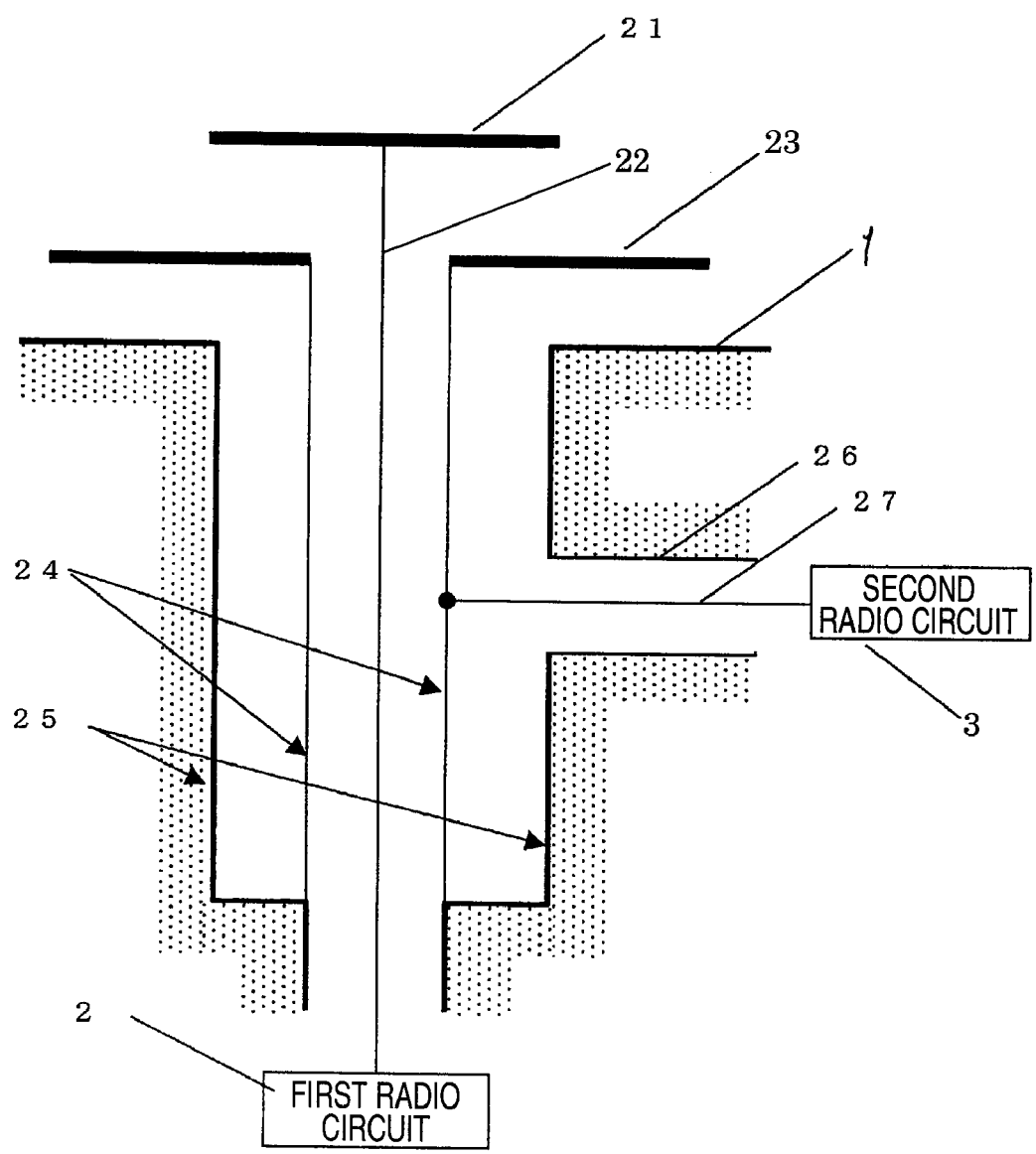
FIG. 21 A configurative view of a multi-band antenna in the prior art.

Also, as an example of the case where the radio antenna unit of the fifth embodiment is applied to the mobile radio device, an example where the radio antenna unit in which the parasitic element 20 is provided onto the folding flip 10 is applied, as shown in FIG. 20, is given. When the dipole antenna operated in the first frequency band is activated, such an effect can be attained by arranging the parasitic element 20 below the antenna element 6 if the parasitic element 20 is shorter than ½ wave that the directivity can be directed forward in the talking state and the broad antenna characteristic can be obtained.

The present invention is explained in detail with reference to the particular embodiments. But it is apparent for those skilled in the art that various variations and modifications can be applied without departing from a spirit and a scope of the present invention.

This application is based upon Japanese Patent Application (Patent Application No. 2004-357328) filed on Dec. 9, 2004; the contents of which are incorporated herein by reference.

INDUSTRIAL APPLICABILITY

According to the radio antenna unit and the mobile radio device equipped with the same of the present invention, the high frequency power input from the first radio circuit is input into the dipole antenna composed of the antenna element, and also the high frequency power input from the second radio circuit is input into the inverted F-type antenna composed of the coaxial transmission line and the antenna element connected to the outer conductor of the coaxial transmission line. Therefore, the radio antenna unit and the mobile radio device equipped with the same of the present invention are useful to the field of the multi-band antenna.

The invention claimed is:

1. A radio antenna unit, comprising:
a ground conductor plate that is provided to a casing of a radio device and has a ground potential;
a first radio circuit that handles a system in a first frequency band and a second radio circuit that handles a system in a second frequency band lower than the first frequency band, which are provided in the ground conductor plate;
a first feeding line that is connected to the first radio circuit, and is a coaxial transmission line having an inner conductor and an outer conductor which are arranged in perpendicular to or in parallel with the ground conductor plate;
a dipole antenna comprising a pair of antenna elements that includes a first antenna element and a second antenna element, wherein the first antenna element of said dipole antenna is connected to the inner conductor of the first feeding line and the the second antenna element of said dipole antenna is connected to the outer conductor of the first feeding line; and
a second feeding line that connects the second radio circuit and the outer conductor, wherein at least one of the first and second antenna elements is operable to transmit a radio signal input from each of the first and second radio circuits.

2. The radio antenna unit according to claim 1, further comprising:
a switching deciding portion that is connected to the first radio circuit and the second radio circuit; and
a switching element that is connected between the second feeding line and the second radio circuit, and is controlled by the switching deciding portion.

3. The radio antenna unit according to claim 1, further comprising:
a reactance element for a second frequency band that is provided between the second feeding line and the second radio circuit.

4. The radio unit according claim 1, further comprising:
a parasitic element that is arranged in parallel with and in vicinity of at least one of the first and second antenna elements.

5. The mobile radio device equipped with the radio antenna unit according to claim 1.

6. The mobile radio device according to claim 5, wherein the radio antenna unit is provided to a lower end portion of the casing of the radio device.

7. The mobile radio device according to claim 6, wherein the radio antenna unit is provided to a flip which is joined to a lower end portion of the casing to turn on an axial line extended in a width direction.

8. The mobile radio device according to claim 6, wherein the radio antenna unit is provided to an element to a lower end portion of the casing to turn on an axial line extended in a thickness direction.

9. The radio antenna unit according to claim 1, wherein the first feeding line is wired to have a bend portion.

10. The radio antenna unit according to claim 9, wherein an inverted F antenna is formed by the second feeding line, the outer conductor of the first feeding line, and the second antennal element of the dipole antenna.

11. The radio unit according claim 1, wherein the dipole antenna is operable as an inverted F-type antenna comprising the second antenna element to transmit the radio signal input from the second radio circuit, and the dipole antenna is operable in another configuration comprising both the first and second antenna elements to transmit the radio signal input from the first radio circuit.

12. A radio antenna unit, comprising:
a ground conductor plate that is provided to a casing of a radio device and has a ground potential;
a first radio circuit that handles a system in a first frequency band and a second radio circuit that handles a system in a second frequency band lower than the first frequency band, which are provided in the ground conductor plate;
a first feeding line that is connected to the first radio circuit, and is a coaxial transmission line having an outer conductor which is arranged in perpendicular to or in parallel with the ground conductor plate;
an antenna element that is connected to the first feeding line and the outer conductor respectively, and is arranged along the ground conductor plate;
a second feeding line that connects the second radio circuit and the outer conductor;
a switching deciding portion that is connected to the first radio circuit and the second radio circuit;
an antenna selecting switch that is connected to the first radio circuit, the second radio circuit, the first feeding line and the second feeding line;
a matching circuit for the first frequency band and the second frequency band, that is provided between the first feeding line and the antenna selecting switch;
a third feeding line for the first frequency band, that connects the outer conductor of the coaxial transmission line;
a feeding line switching switch that is connected to the second feeding line and the third feeding line and the antenna selecting switch;
a reactance element for a second frequency band, that is provided between the second feeding line and the feeding line switching switch; and
a reactance element for a first frequency band, that is provided between the third feeding line and the feeding line switching switch;
wherein length of the antenna element is set to almost ½ wave in the second frequency band and is set to ½ wave or more in the first frequency band; and
wherein the second feeding line is used for the second frequency band.

* * * * *